United States Patent
Keramat et al.

(10) Patent No.: US 7,920,006 B1
(45) Date of Patent: Apr. 5, 2011

(54) CLOCKING SCHEME FOR EFFICIENT DIGITAL NOISE REDUCTION IN MIXED-SIGNAL SYSTEMS-ON-CHIP

(75) Inventors: Mansour Keramat, San Jose, CA (US); Keivan Etessam Yazdani, San Jose, CA (US)

(73) Assignee: Alvand Technologies, Inc., Santa Clara, CA (US)

( * ) Notice: Subject to any disclaimer, the term of this patent is extended or adjusted under 35 U.S.C. 154(b) by 0 days.

(21) Appl. No.: 12/338,772

(22) Filed: Dec. 18, 2008

(51) Int. Cl.
*G06F 1/04* (2006.01)
(52) U.S. Cl. .............................. 327/291; 377/47; 377/48
(58) Field of Classification Search .................. 327/117, 327/118, 156, 158, 147, 291, 295–297; 377/47, 377/48
See application file for complete search history.

(56) References Cited

U.S. PATENT DOCUMENTS

| | | | |
|---|---|---|---|
| 6,411,669 B1 * | 6/2002 | Kim ................................. | 377/48 |
| 2009/0156135 A1 * | 6/2009 | Kamizuma et al. ............. | 455/73 |
| 2009/0268916 A1 * | 10/2009 | Miyagi ............................. | 381/3 |

* cited by examiner

*Primary Examiner* — Lincoln Donovan
*Assistant Examiner* — Diana J Cheng
(74) *Attorney, Agent, or Firm* — Maryam Imam; IPxLaw Group LLP

(57) ABSTRACT

In one embodiment of the present invention, a clock generator circuit receives a clock signal having a period. The clock signal is employed by a digital circuit that is resident on the same substrate as an analog circuit, the digital circuit generates disturbance climaxes at clock edges that propagate through the substrate to the analog circuit. A clock generator circuit generates a plurality of clock signals, with each clock signal having a unique rate, wherein during a temporal gap, defined by the time between a last disturbance climax and a next sampling time of the clock signal, clock edges of any of the plurality of clock signals are avoided.

2 Claims, 4 Drawing Sheets

CLOCKING SCHEME FOR EFFICIENT DIGITAL NOISE REDUCTION IN MIXED-SIGNAL SYSTEMS-ON-CHIP

BACKGROUND OF THE INVENTION

1. Field of the Invention

The present invention relates generally to the field of mixed-signal systems-on-chip (SoC) and more particularly, to the reduction of noise at sampling times of analog circuits in mixed-signal SoCs.

2. Description of the Prior Art

With the advent of the digital age, technology has rapidly advanced in recent decades. Such advancements have resulted in combining analog and digital circuitry in mixed-signal systems-on-chips (SoCs) integrating analog and digital circuits onto a common substrate of a chip (or integrated circuit).

Analog circuits typically exhibit high levels of sensitivity to noise. On the other hand, digital blocks can induce significant amount of disturbance and adversely impact the performance of neighboring analog circuits. In certain designs of SoCs, for example, an analog-to-digital converter (ADC) may be placed next to a digital signal processor (DSP). The ADC converts signals that are in analog form to digital form. In so doing, the ADC samples the analog signal at predetermined time periods (sampling times) to generate the digital signal. It is important to minimize or even eliminate the amount of disturbance generated by the DSP at sampling time when an ADC and DSP residing on the same substrate. Otherwise, key performance characteristics of the ADC, such as signal-to-noise ratio (SNR), is substantially degraded. This is perhaps better understood with reference to a figure.

FIG. 1 shows a timing diagram of clocks generated (clocking scheme) using prior art techniques. The clock signals in FIG. 1, CLK1X, CLK2X, and CLK4X, are applied to the DSP (or digital circuit) and trigger its activities. The clock signal, CLK1X, has the same frequency or period as that of the ADC clock reflected by the clock signal CLK_ADC. It is well known that digital circuits typically employ the edge of a clock to synchronize, sample digital signals, or trigger certain activities. Accordingly, as shown in FIG. 1 using the dashed line, the digital activity spikes at the rising and falling edges of the signal CLK1X.

In FIG. 1, the clock signal, CLK2X, has a frequency twice that of the signal CLK1X and the signal, CLK4X, has a frequency twice that of the CLK2X. At the edges of all of these clock signals, the activity of the digital circuit (DSP in this case) that resides on the same substrate as that of the analog or ADC peaks and tapers off within half of a period. As earlier noted, in FIG. 1, corresponding digital activities/disturbances generated by each of the clock signals, CLK1X, CLK2X and CLK4X, are drawn as dashed lines. However, the tapering off of activity of the DSP circuit barely occurs before the analog signal is sampled by the ADC (at the rising edge of the clock signal CLK_ADC). That is, the time from the completion of the DSP activity (disturbance climaxes) and the ADC sampling time, $t_{Quiet}$ (also known as temporal gap or the quit zone) is undesirably small, which leads to noise on the signal CLK_ADC and therefore unreliable sampling.

Therefore, the need arises for analog circuits having enhanced noise immunity from digital circuits sharing a common substrate on a chip or integrated circuit.

SUMMARY OF THE INVENTION

Briefly, a clock generator circuit receives a clock signal having a period. The clock signal is employed by a digital circuit that is resident on the same substrate as an analog circuit, the digital circuit generates disturbance climaxes at clock edges that propagate through the substrate to the analog circuit. A clock generator circuit generates a plurality of clock signals, with each clock signal having a unique rate, wherein during a temporal gap, defined by the time between a last disturbance climax and a next sampling time of the clock signal, clock edges of any of the plurality of clock signals are avoided.

These and other objects and advantages of the present invention will no doubt become apparent to those skilled in the art after having read the following detailed description of the preferred embodiments illustrated in the several figures of the drawing.

IN THE DRAWINGS

FIG. 1 shows a timing diagram of clock signals generated (clocking scheme) using prior art techniques.

FIG. 2 shows a three-dimensional representation of a substrate 100 to include a digital circuit 104 and an analog circuit 102, both of which are made on the substrate 100.

DETAILED DESCRIPTION OF THE PREFERRED EMBODIMENT

The present invention generally describes a clock generator circuit that generates digital-signal-processor (DSP) clock signals. The ADC clock signal is employed for sampling by an ADC circuit that is resident on the same substrate as a digital circuit, the digital circuit generates disturbance climaxes at clock edges that propagate through the substrate to the ADC. The clock generator circuit generates a plurality of clock signals, with each clock signal having a unique rate, wherein during a temporal gap, defined by the time between a last disturbance climax and a next sampling time of the ADC clock signal, clock edges of any of the plurality of clock signals are avoided. The temporal gap is maximized in order to suppress the adverse effect of the digital noise on the analog circuitry without compromising power, area, and number of calculations done by the DSP.

An example of a clock generator circuit of the present invention is shown and discussed relative to the various embodiments of the present invention, however, it should be understood that these figures and discussion are merely examples of the present invention and other implementations or forms of the clock generator circuit are anticipated without departing from the scope and spirit of the present invention.

Figure 1:
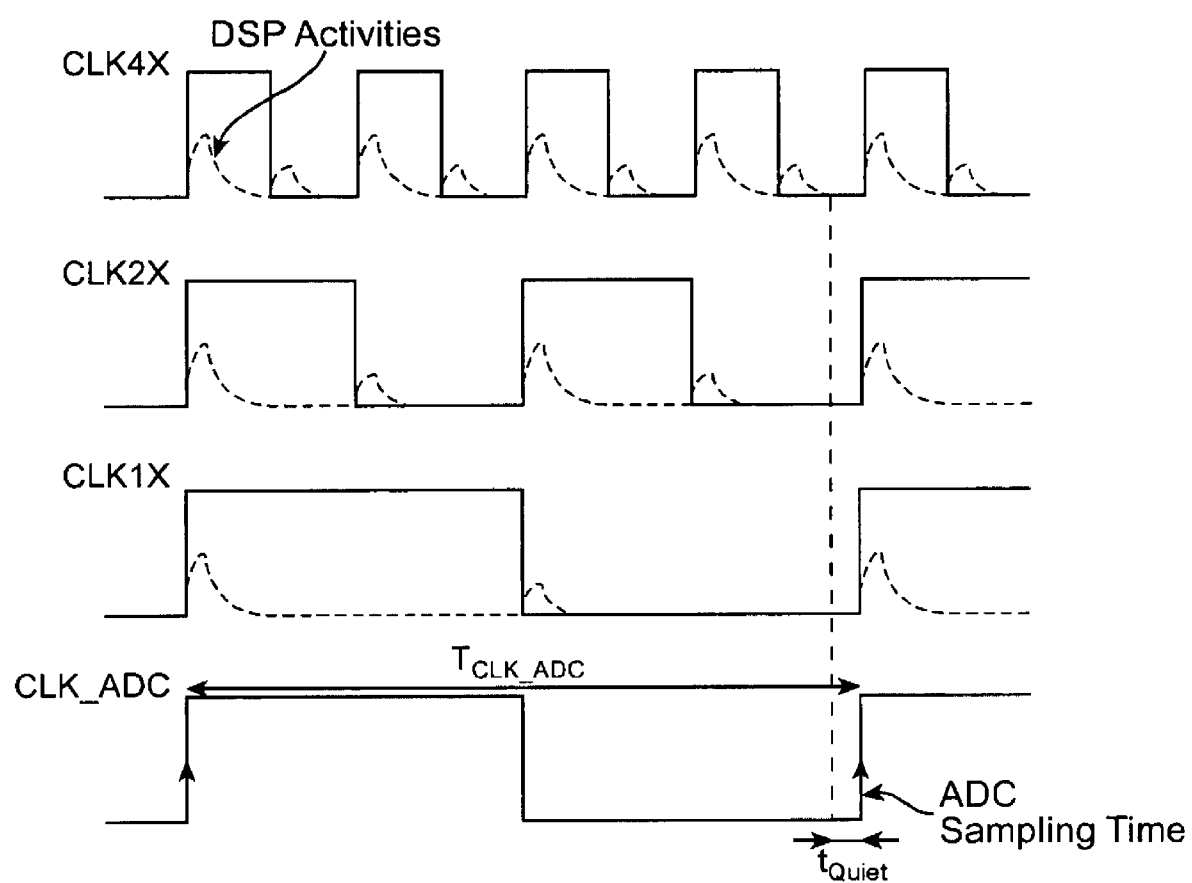
Figure 2:
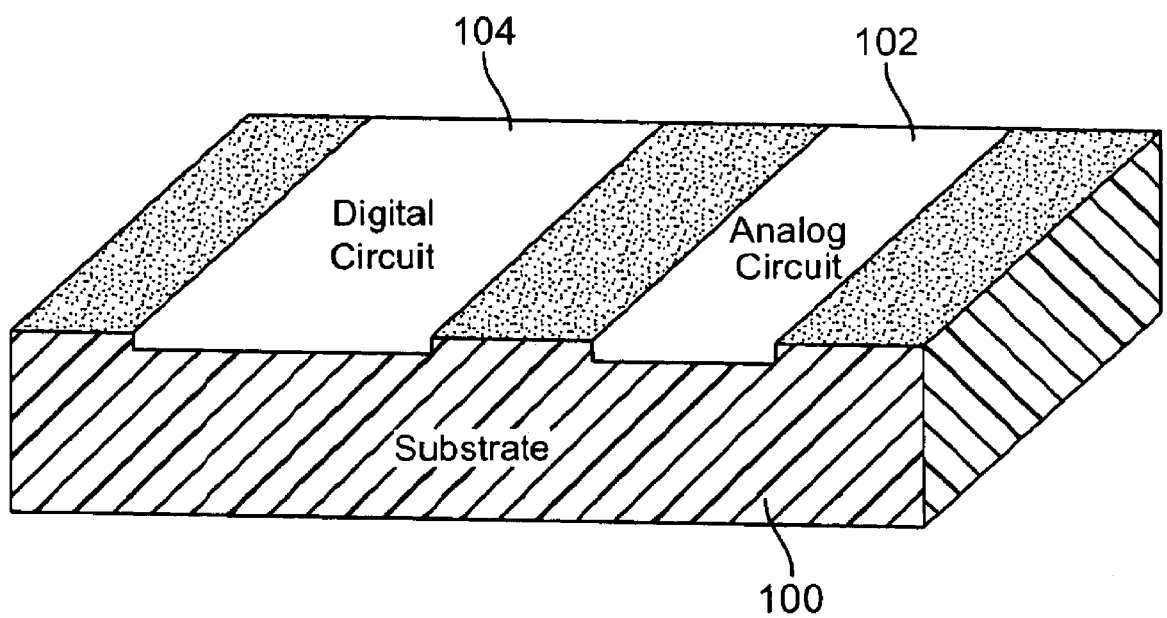

Referring now to FIG. 2, a three-dimensional representation of a substrate 100 is shown to include a digital circuit 104 and an analog circuit 102, both of which are made on the substrate 100. The digital circuit 104, generates certain noise that propagates through the substrate 100 to the analog circuit 102. However, as will be evident in relation to subsequent figures, the noise immunity of analog circuit 100 is advantageously maximized by a larger temporal gap (the quiet zone) between disturbance climaxes of the digital circuit 104 and the sampling times experienced by the analog circuit 102.

Figure 3:
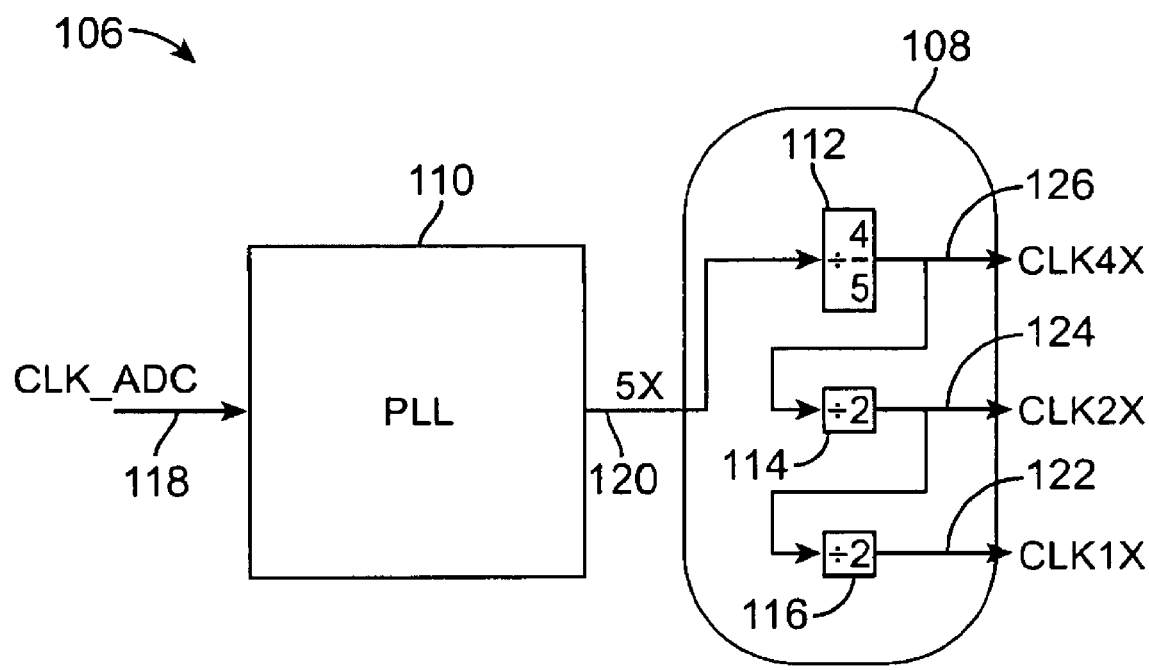
FIG. 3 shows a block diagram of a clock generating circuit 106, in accordance with an embodiment of the present invention.

FIG. 3 shows a block diagram of a clock generating circuit 106, which is a mixed-signal circuit including digital and analog circuit(s), in accordance with an embodiment of the present invention. The circuit 106 is typically a part of a system-on-chip (SOC) having mixed-signals. Mixed-signals refer to having both digital and analog form of signals. That is, the clock generating circuit 106 and a digital circuit (not shown) share a common substrate by residing or being built thereon. An example of a digital circuit is a digital (or discrete) signal processor (DSP). The clock generating circuit 106 generates a clock signal generally employed by digital circuits, such as a DSP that resides on a substrate in common with analog circuit, such as that shown in FIG. 2. The DSP is an example of a digital circuit that uses the clock signal to sample, synchronize with or trigger other signals. The clock signal, generated by the clock generating circuit 106, is employed by a digital circuit that is resident on the same substrate as an analog circuit, the digital circuit generates disturbance climaxes at clock edges that propagate through the substrate to the analog circuit.

The clock generating circuit 106 is shown to include a phase lock loop (PLL) 110 and a clock generator sub-circuit 108. The PLL 110 is shown to receive a CLK_ADC signal 118. The signal 118 is a clock signal used for generating the desired clock signal to be used by digital circuits. In the embodiment of FIG. 3, this may be any of the signals 126, 124 or 122. The PLL 110 is shown to generate a fast clock signal 120. The fast clock signal 120 is typically much faster than any of the other clock signals employed by the digital circuit. In one embodiment of the present invention, the fast clock signal 120 is five times faster than signal 118. That is, the rate of the fast clock signal 120 is five times higher than that of the signal 118.

The sub-circuit 108 is shown to include a first divider 112, a second divider 114 and a third divider 116. The divider 112 is shown to receive the signal 120 and to generate a CLK4X signal 126 by dividing the signal 120 by four-fifths. Four-fifths is an example of a divide value. It is understood that divide values are determined by design choices.

In the example where the divide value associated with the divider 112 is fourth-fifths, the rate of the CLK4X signal is four-fifths of that of the signal 120. The signal 126 is then provided as input to the divider 114, which divides the signal 126 by two, generating the CLK2X signal 124. That is, the rate of the CLK2X signal 124 is two-fifths that of the rate of the signal 120.

The signal 124 is provided as input to the divider 116 that serves to divide the signal 124 by two to generate the CLK1X 122, which is one-fifths that of the rate of the signal 120.

In practical designs, division of a signal is performed by resampling, well known to those skilled in the art. Similarly, PLLs are well known to those skilled in the art. Briefly, a PLL is a control system that generates a signal that has a fixed relation to the phase of a "reference" signal. A phase-locked loop circuit responds to both the frequency and the phase of the input signals, automatically raising or lowering the frequency of a controlled oscillator until it is matched to the reference in both frequency and phase. A phase-locked loop is an example of a control system using negative feedback.

In simpler terms, a PLL compares the frequencies of two signals and produces an error signal which is proportional to the difference between the input frequencies. The error signal is used to drive a voltage-controlled oscillator (VCO) which creates an output frequency. The output frequency is fed through a frequency divider back to the input of the system, producing a negative feedback loop. If the output frequency drifts, the error signal will increase, driving the frequency in the opposite direction so as to reduce the error. Thus, the output is locked to the frequency at the other input. This input is called the reference and is typically derived from a crystal oscillator, which is very stable in frequency. In this case, the reference is the signal 118.

As previously noted, the temporal gap, or quiet zone, is maximized. In one embodiment of the present invention, the temporal gap is increased from $t_{Quiet}$ to $t_{Quiet}+(\frac{1}{5})T_{CLK\_ADC}$ and subsequently the adverse effect of the digital circuit's noise on the ADC is substantially reduced. The circuit 108 results in 30% to 50% improvement (3 dB~6 dB) in the performance of the circuit 106.

For the circuit 108 to operate effectively, the digital circuit needs to operate at higher speeds (up to 20% faster) compared to the conventional case. Furthermore, the core VCO in or working with the PLL 110 needs to run 25% faster than that of conventional architectures.

It is understood that while three dividers are used to generate three clock signals in the embodiment of FIG. 3, any number of dividers and clock signals may be employed. The dividing factor for each divider is a function of the rate or speed of the clock signals desired.

The signals 122, 124 and 126 are employed by the digital circuit to trigger certain events or to synchronize other signals. Essentially, they are clock signals whose edges cause activity in the digital circuit. As earlier noted, disturbance climaxes are encountered at edges of each of these clock signals. The circuit 108 advantageously serves to remove edges at a temporal gap that is longer and maximized relative to prior art. That is, time period from the last disturbance climax to the next sampling time, or $t_{Quiet}$, is maximized.

Figure 4:
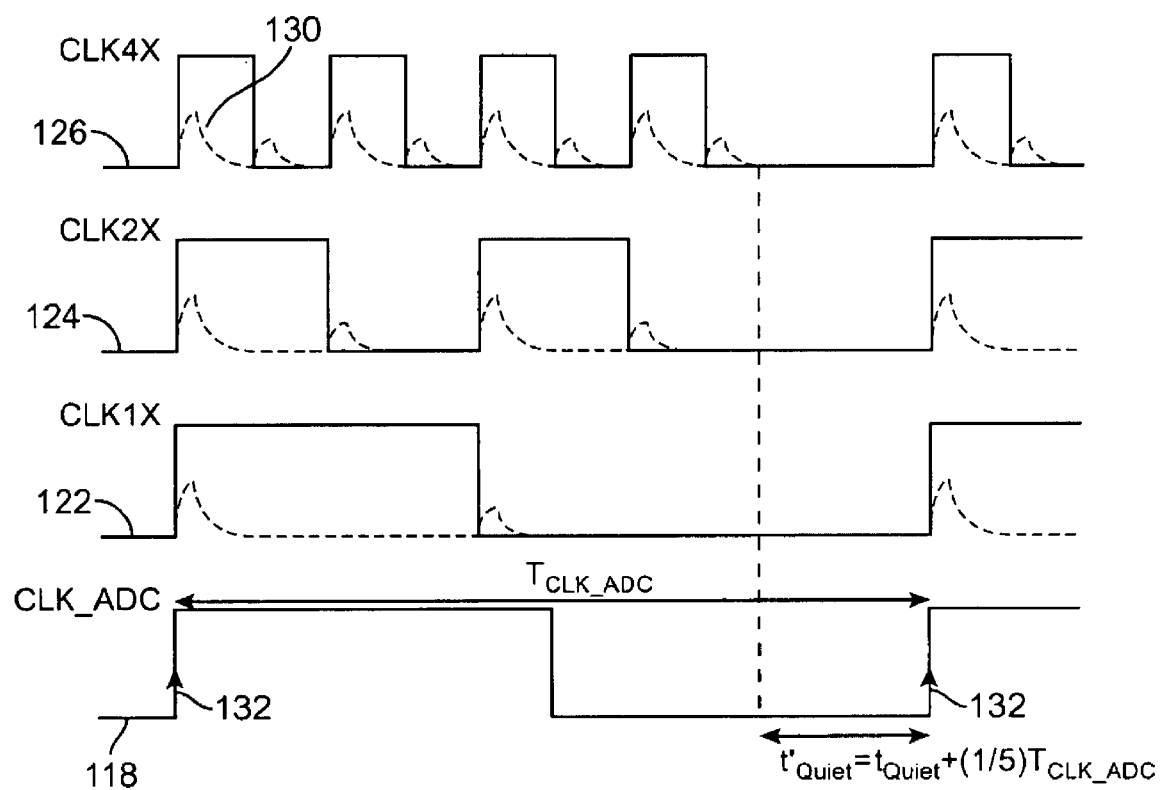
FIG. 4 shows a timing diagram of the clock signals 118, 122, 124 and 126 of the embodiment of FIG. 3.

This is perhaps better appreciated with respect to a timing diagram. FIG. 4 shows a timing diagram of the clock signals 118, 122, 124 and 126 of the embodiment of FIG. 3. Disturbance climaxes 130 are shown at each edge of each of the signals. There is however, no such climaxes during a temporal gap, $t'_{Quiet}$. In one embodiment, $t'_{Quiet}$ is $t_{Quiet}+(\frac{1}{5})T_{clk\_ADC}$ with $t_{Quiet}$ being the temporal gap experienced by prior art techniques and $T_{clk\_ADC}$ being the period of signal 118. That is, the temporal gap of the embodiment of FIG. 3 has advantageously been increased by $(\frac{1}{5})T_{clk\_ADC}$. There are no edges of any clock signals during the temporal gap therefore preventing noise to cause disturbances and unreliability during sampling time. At sampling times 132, the digital portion of the ADC samples the signal to generate one or more bits.

It is understood that while fixed or absolute numbers are provided herein as the divide values that they are intended to merely serve as examples and that other valued may be employed to divide a signal. It is also understood that ratio(s) of the divide values, as well as the number of clock dividers may be adjusted depending on the needs of the digital circuit such that the temporal gap becomes larger. For example, there might be a case where the DSP needs 10 clocks (in the presented example it needed three clocks only: CLK1X, CLK2X, and CLK4X) with 10 predetermined frequencies. Various embodiments of the present invention may be employed where the number of the clock dividers and the division ratios are determined based on the design needs.

As known by one of ordinary skill in the art, the present invention, including any logic circuit or transistor circuit, may be modeled, generated, or both by computer based on a description of the hardware expressed in the syntax and the semantics of a hardware description language (HDL). Such HDL descriptions are often stored on a computer readable medium. Applicable HDLs include those at the layout, circuit netlist, and/or schematic capture levels. Examples of HDLs include, but are not limited to: GDS II and OASIS (layout level); various SPICE languages, and IBIS (circuit netlist level); and Virtuoso custom design language and Design Architecture-IC custom design language (schematic capture level). HDL descriptions may also be used for a variety of purposes, including but not limited to layout, behavior, logic and circuit design verification, modeling, and/or simulation.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A clock generator circuit, for generating an analog-to-digital converter (ADC) clock signal having a period, the ADC clock signal being employed for sampling by an ADC circuit that is resident on the same substrate as a digital circuit, the digital circuit generating disturbance climaxes at clock signal edges that propagate through the substrate to the ADC circuit, the clock generator circuit for generating a plurality of clock signals, with each clock signal being a unique rate, wherein during a temporal gap, defined by the time between a last disturbance climax and a next sampling time of the ADC clock signal, clock edges of any of the plurality of clock signals are avoided, the clock generator circuit including a plurality of clock dividers, a first clock divider responsive to a first clock signal, the first clock signal being at least a predetermined number of times faster that of the rate of the slowest clock employed by the digital circuit, and the first clock divider operative to generate a second clock signal by dividing the first clock signal by four-fifths when the clock is rate is substantially five times that of the rate of the slowest clock rate;

a second clock signal divider responsive to the second clock signal and operative to generate a third clock signal by directly dividing the second clock signal by two;

a third clock divider responsive to the third clock signal and operative to generate a fourth clock signal by directly dividing the third clock signal by two, wherein the second, third and fourth clock signals directly cause maximization of the temporal gap, wherein the temporal gap is a quiet time plus one-fifth of a period of the ADC clock signal.

2. A clock generator sub-circuit adapted for use with a phase lock loop (PLL), the PLL receiving an analog-to-digital (ADC) clock signal, and the clock generator sub-circuit on a substrate including an analog and a digital circuit, the digital circuit causing noise to be propagated through the substrate to the analog circuit, an ADC circuit experiencing disturbance climaxes caused by clock edges, the clock generator sub-circuit comprising:

a first clock divider responsive to a first clock signal being a predetermined number of times faster than that of the rate of the slowest clock signal employed by the digital circuit, and operative to generate a second clock signal by dividing the first clock signal by four fifths;

a second clock divider responsive to the second clock signal and operative to generate a third clock signal by directly dividing the second clock signal by two;

a third clock divider responsive to the third clock signal and operative to generate a fourth clock signal by directly dividing the third clock signal by two, wherein the second, third and fourth clock signals directly cause maximization of the temporal gap, wherein the temporal gap is defined by the time from a last disturbance climax and the next ADC clock signal sampling time being increased by ⅕ of Tclk_ADC, wherein Tclk_ADC is the period of ADC clock signal.

* * * * *